United States Patent [19]

Liao et al.

[11] Patent Number: 5,211,854
[45] Date of Patent: May 18, 1993

[54] WATER SOLUBLE GRAFT COPOLYMERS AND METHODS OF USE THEREOF

[75] Inventors: Wen P. Liao, Warminster; Fu Chen, Newtown, both of Pa.

[73] Assignee: Betz Laboratories, Inc., Trevose, Pa.

[21] Appl. No.: 691,206

[22] Filed: Apr. 25, 1991

[51] Int. Cl.$^5$ .................. C02F 1/56; C08F 265/10
[52] U.S. Cl. ................... 210/734; 525/260; 525/263; 525/269; 525/291; 525/293; 525/285; 525/296; 525/301; 525/303; 525/308
[58] Field of Search ............ 210/734; 525/260, 263, 525/269, 291, 293, 296, 285, 301, 303, 308

[56] References Cited

U.S. PATENT DOCUMENTS

| | | | |
|---|---|---|---|
| 3,284,393 | 11/1966 | Vanderhoff et al. | 526/207 |
| 3,711,573 | 1/1973 | Nagy | 210/734 |
| 3,869,418 | 3/1975 | Peterson et al. | 260/29.7 |
| 3,899,471 | 8/1975 | Lorenz et al. | 210/734 |
| 3,951,791 | 4/1976 | Huang et al. | 210/734 |
| 3,993,712 | 11/1976 | Guilbault | 210/734 |
| 4,152,307 | 5/1979 | Shibahara et al. | 210/734 |
| 4,191,645 | 3/1980 | Begala, Jr. et al. | 210/734 |
| 4,271,053 | 6/1981 | Kelsey et al. | 260/29.2 EP |
| 4,400,496 | 8/1983 | Butler et al. | 527/312 |
| 4,599,390 | 7/1986 | Fan et al. | 210/734 |
| 4,835,206 | 5/1989 | Farrar et al. | 525/296 |
| 4,835,234 | 5/1989 | Valint et al. | 526/258 |
| 4,916,191 | 4/1990 | Takeuchi et al. | 526/276 |
| 5,108,622 | 4/1992 | Liao et al. | 210/734 |

FOREIGN PATENT DOCUMENTS 0356241  2/1990  European Pat. Off. .

OTHER PUBLICATIONS

Smirnova et al., Journal of Polymer Science, vol. 29, pp. 139-145, 1991 "Complexing Effect in the Reaction of Graft Polymerization Proceeding by the Coordination-Radical Mechanism With the Participation of Copper Ions".

"Hawley's Condensed Chemical Dictionary", 11th ed, New York, Van Nostrand Reinhold, 1987, p. 224.

Primary Examiner—James J. Seidleck
Assistant Examiner—Vasu S. Jagannathan
Attorney, Agent, or Firm—Alexander D. Ricci; Gregory M. Hill

[57] ABSTRACT

A water soluble graft copolymer useful for dewatering wastewater having the structure:

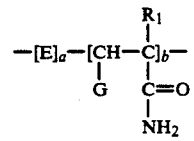

wherein E is the repeat unit obtained after polymerization of an $\alpha,\beta$ ethylenically unsaturated compound the molar percentage of a:b is from about 95:5 to 5:95 with the proviso that the sum of a and b equals 100%; G comprises the structure:

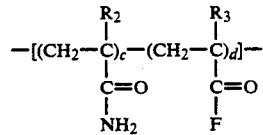

wherein d is a cationic monomer, $R_1$, $R_2$ and $R_3$ are the same or different and are hydrogen or a lower alkyl group having $C_1$ to $C_3$, F is the salt of an ammonium cation and the molar percentage of c:d is from 95:5 to 5:95 with the proviso that the sum of c and d equals 100%.

12 Claims, No Drawings

WATER SOLUBLE GRAFT COPOLYMERS AND METHODS OF USE THEREOF

FIELD OF THE INVENTION

The present invention pertains to novel water soluble graft copolymers which are useful for water treatment, such as sludge dewatering and water clarification. In addition they are also effective as retention and drainage aids in the paper making process.

BACKGROUND OF THE INVENTION

There is an increasing usage of water soluble polymers and copolymers in wastewater treatment industries. These compounds have shown desirable utility for the purpose of dewatering sludge and clarifying contaminated water.

The efficacies of the polymers or copolymers used will vary depending upon the type of monomers chosen to form the polymer or copolymer, the molecular weight of the synthesized molecule and, in the case of a copolymer, the placement of the selected monomers on the backbone of the copolymer. It is the latter characteristic that is the focus of the present invention.

Polymers with long sequences of two monomers can be categorized as block copolymers or graft copolymers. In graft copolymers sequences of one monomer are "grafted" onto a "backbone" of the second monomer type,

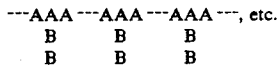

Graft copolymers have unique and highly desirable properties as compared to random copolymers or the blend of two homopolymers. Therefore, there is a great interest in preparing them. Few techniques described in the literature satisfy the need.

Furthermore, with ever increasing usales of water soluble polymers and copolymers in industries such as wastewater treatment, cooling, boiler and deposit control, coating, textile, mining, detergency, cosmetics. and paper, etc , there is an urgent need to synthesize novel water soluble graft copolymers for this broad range of applications.

It is a further object of this invent.on to prepare distinctive water soluble graft copolymers for water treatment applications.

U.S. Pat. No. 3,869,418 describe a graft copolymer comprising a polymeric N-vinyl lactam such as N-vinyl pyrrolidone with unsaturated carboxylic acids, like acry ic acid and methacrylic acid in an emulsion process. The resulting copolymer is not water soluble and is used for adhesive and coating applications.

U.S. Pat. No. 4,271,053 discloses quaternary ammonium graft copolymers prepared by grafting quaternary aamonium ionene-type polymeric side chains onto a polymer backbone formed by the reaction of a difunctional amine and an epihalohydrin or diperoxide. The polymers are different than the present invention.

U.S. Pat. No. 4,400,496 and European Pat. No. Application 0 356 241 teach grafting acrylamide or acrylic acid with starch in the presence of ceric ions. The product has to be precipitated and separated in acetone prior to use.

Smirnova et. al., Journal of Polymer ;cience, Vol. 29, pp. 139-145 describe a graft copolymerization of methacrylic acid with polycaproamide by the persulfate/sulfite redox system in the presence of copper ions. It is a different reaction mechanism and results in a different copolymer than the present invention.

U.S. Pat. No. 4,916,191 discloses a graft copolymer prepared from a macromonomer with hydrophilic and fluorinated monomers for dispersion stabilizer in an emulsion polymerization process.

Compared to the related art disclosed above, there exists a need to prepare water soluble graft copolymers in a convenient and economic process. This objective is achieved by the present invention. The resulting copolymers exhibit desired efficacy for sludge dewatering applications.

DETAILED DESCRIPTION OF THE INVENTION

The present invention pertains to novel water soluble T graft copolymers which are useful for water treatment, such as sludge dewatering and water clarification. In addition, they are also effective as retention and drainage aids in paper/pulp making processes.

Specifically, the graft polymers in the invention contain polymeric segments obtained from the polymerization of acrylamide and cationic monomers which are attached or "grafted" to another polymer chain which is comprised of the repeating units of one or more monomers. The resulting graft copolymers are soluble in an aqueous medium.

The graft copolymer of the invention has the general structure:

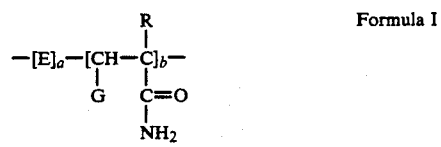

Formula I wherein E in the above formula (Formula I) is the repeat unit obtained after polymerization of an α,β ethylenically unsaturated compound, preferably carboxylic acid, amide form thereof, alkyl (C1-C8) ester, or hydroxylated alkyl (C1-C8) ester of such carboxylic acid or sulfonic acid. Compounds encompassed by E include the repeat unit obtained after polymerization of acrylamide, methacrylamide, acrylic acid, methacrylic acid, maleic acid or anhydride, styrene sulfonic acid, 2-acrylamico-2-methylpropyl sulfonic acid, itaconic acid, and the like. Ester derivatives of the above mentioned acids such as 2-hydroxypropyl acrylate, methyl methacrylate, and 2-ethylhexyl acrylate, are also within the purview of the invention.

The molar percentage of a:b is from about 95:5 to 5:95, with the proviso that the sum of a and b equals 100%.

G in the above formula (Formula I) is a polymeric segment comprising repeat units having the structure:

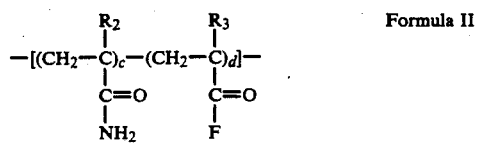

Formula II wherein $R_1$, $R_2$ and $R_3$ in Formulae I and II are the same or different and are hydrogen or a lower alkyl group having $C_1$ to $C_3$ Monomer d is a cationic monomer. F in the above formula is a salt of an ammonium cation, such as $NHR_3N^+R_{(4,5,6)}$ $M^-$ or $OR_3N^+R_{(4,5,6)}$ $M^-$, wherein $R_3$ is a $C_1$ to $C_4$ linear or branched alkylene group, and $R_4$, $R_5$ and $R_6$ can be selected from the group consisting of hydrogen, $C_1$ to $C_4$ linear or branched alkyl, $C_5$ to $C_8$ cycloalkyl, aromatic or alkylaromatic group; and M is an anion, such as chloride, bromide, or methyl or hydrogen sulfate. Typical cationic monomers are 2-acryloyloxyethyltrimethyl ammonium chloride (AETAC), 3-methacrylamidopropyltrimethyl ammonium chloride (MAPTAC), 2-methacryloyloxyethyltrimethylammonium chloride (METAC) and diallyl dimethylammonium chloride (DADMAC), etc.

It is to be understood that more than one kind of cationic monomer may be present in Formula II.

The molar percentage c:d in Formula II may vary from 5:5 to 5:95, with the proviso, however, the sum of c and d equals 100%.

There is no limit to the kind and mol8 percent of the monomers chosen so long as the total adds up to 100 mole % and the resulting copolymers are water soluble.

At present, the preferred water soluble graft copolymer for use in sludge dewatering is:

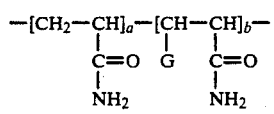
Formula III

The molar percentage of a:b is from about 95:5 to 5:95, with the proviso that the sum of a and b equals 100%. G in Formula III is:

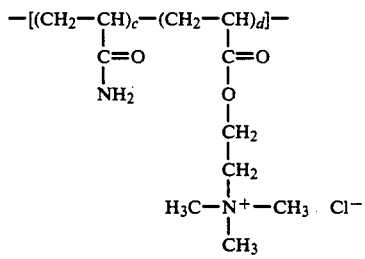
Formula IV

Monomer d is 2-acryloyloxyethyltrimethyl ammcnium chloride (AETAC). The molar percentage c:d in the polymer segment G (Formula IV) is the ratio of Acrylamide:AETAC. It may fall within the range between 95:5 and 5:95. The sum of c and d must add up to 100%.

The number average molecular weight (Mn) of the polymeric segment G is not critical and may fall within the range of 1,000 to 1,000,000. Preferably, the number average molecular weight will be within the range of 5,000 to 500,000, with the range of about 10,000 to about 200,0DO being even more desirable. The key criterion is that the resulting graft copolymer be water soluble.

The graft copolymer is prepared via a two-step polymerization process. First, a macromonomer comprised of acrylamide and AETAC is prepared by a solution polymerization method using peroxide as an initiator. The initiator may be selected from peroxides, persulfates, bromates, and azo-type initiators such as 2,2′azo-bis-(2-amidino-propane) dihydrochlo.ide, 2,2′-azobis-(2,4-dimethylvaleronitrile). Copper (II) sulfate is added in the process as an oxidative chain transfer agent to generate a terminal unsaturated double bond in the polymer chain. It is conceivable that transition metal ions other than copper, such as iron, cobalt, and nickel etc., may be used in the invention.

Ethylenediamine tetraacetic acid or dlethylenetriamine pentaacetic acid and their salts are used as chelating agents to chelate copper prior to the second polymer zation step.

The resulting macromonomer is then ccpolymerized with acrylamide or other monomers to form graft ccpolymers by a water-in-oil inverse emulsion technique. Such processes have been disclosed in U.S. Pat. Nos. 3,284,393, Reissue 28,474 and Reissue 28,576, herein incorporated by reference. The resulting copolymer may also be further isolated by precipitating it in an organic solvent such as acetone and dried to a powder form. The powder can be easily dissolved in an aqueous medium for use in desired applications.

Branching agents such as polyethylenellycol di(-meth)-acrylate, methylene bis(meth)acrylamide, N-vinyl acrylamide, allyl glycidyl ether, glycidyl acrylate and the like may also be added, providing the resulting graft copolyme is water soluble. Any of the well known chain transfer agents familiar to those who skilled in the art may be used to control the molecular weight. Those include, but are not limited to, lower alkyl alcohols such as isopropanol, amines, mercaptans, phosphites, thioacids, formate, allyl alcohol and the like.

Conventional initiators such as peroxide, persulfate, along with sulfite/bisulfite and azo compounds may be used depend on the system chosen.

High HLB inverting surfactants such a: those described in U.S. Pat. No. 28,474 are then added to the emulsion to convert the resulting emulsion to a "self-inverting" emulsion. Using the procedure described herein, a unique graft copolymer in emulsion form is obtained.

It is to be understood that the aforementioned polymerization methods do not in any way limit the synthesis of copolymers according to this invention.

The resulting emulsion disperses and dissolves rapidly into an aqueous solution upon addition to water. Within minutes, a maximum solution viscosity is obtained. The emulsion dissolves well even in water containing a high level of hardness and it also retains most of its solution viscosity in brine water.

The structure of the graft copolymer is substantiated by a conventional solution viscosity study and $C_{13}$ NMR spectroscopy. The molecular weight of the resulting graft copolymer is not critical, as long as it is soluble in water. The molecular weight may vary over a wide range, e.g., 10,000–30,000,000 and may be selected depending upon the desired application. The invention finds its greatest usefulness in sludge dewatering when the acrylamide copolymers have molecular weights in excess of 1,000,000.

EXAMPLES

SYNTHESIS OF GRAFT COPOLYMERS

Example 1-3

Synthesis of Macromonomers

5 To a suitable flask equipped with a condenser, a thermometer, a nitrogen inlet, and an overhead agitator was charged with the desired amount of reagents as shown in Table I. The solution was adjusted to pH 5.1 and then cooled to 15° C. After the solution was sparged with nitrogen for 3C minutes, a tertbutyl hydroperoxide solution was added to it. Exotherm started immediately and the reaction temperature increased correspondingly. The polymerization was terminated by purging with air into the solution and by the addition of EDTA 2Na solution after a certain period of reaction time.

TABLE I

Synthesis of Macromonomers

| Reagents Charged | Example 1 | Example 2 | Example 3 |
|---|---|---|---|
| Acrylamide (53% in water) | 100.70 | 196.62 | 228.15 |
| AETAC* (79,2% in water) | 173.61 | 181.58 | 129.98 |
| CuSO4 5H2O | 0.038 | 0.055 | 0.055 |
| D.I. Water | 101.31 | 108.29 | 77.40 |
| t-BHP** (2.2% in water) | 5.43 | 8.07 | 8.71 |
| EDTA 2Na*** | 50.00 | 75.00 | 75.31 |
| Mn X 10⁴**** | 5.5 | 4.2 | 3.1 |

*AETAC = 2-acryloyloxyethyltrimethyl ammonium chloride
**t-BHP = tert-butylhydroperoxide; 70% active
***EDTA 2Na = disodium ethylenediamine tetraacetate
****The number average molecular weight of the polymers was determined by gel permeation chromatography.

Example 4-6

Synthesis of Graft Copolymer—Redox Initiation

Graft copolymers were prepared by copolymerizing the macromonomers of Examples 1 to 3 with acrylamide by an inverse emulsion polymerization method. The polymerizations were carried out in a similar apparatus as the Example 1. The oil phase was composed of sorbitan monoleate, oleic isopropanolamid and a low volatile aliphatic oil (LOPS®). The aqueous phase contained acrylamide, ammonium chloride, water, and one of the macromonomers from Examples 1-3. The aqueous phase was then transferred to the oil phase and the mixture was homogenized to obtain a stable emulsion. The resulting emulsion was then sparged with nitrogen.

The polymerization was carried out by adding the aqueous solution of sodium metabisulfite (SMB) into the emulsion to react with the t-BHP that remained in the macromonomer solution. About 15 g of 1.1% SMB solution was added over a period of time of 3 hours. The polymerization temperature was controlled to a maximum of 40C. After the addition of SMB solution was complete, additional t-BHP and 30% SMB solution was slowly added to react with the residual monomers. High HLB surfactants were then slowly added to the emulsion to obtain a self-inverting emulsion. The reagent charges and the intrinsic viscosity of the resulting graft copolymers are shown in Table II.

TABLE II

Graft Copolymerization (by inverse emulsion polymerization)

| Reagents Charged | Example 4 | Example 5 | Example 6 | Example 7 |
|---|---|---|---|---|
| Sorbitan monooleate | 3.78 | 3.78 | 3.78 | 3.77 |
| Oleic isopropanolamid | 3.78 | 3.78 | 3.78 | 3.78 |
| LOPS ® | 105.63 | 105.13 | 105.27 | 100.12 |
| Vazo 52 | — | — | — | 0.083 |
| Acrylamide (50% in water) | 189.64 | 160.64 | 131.11 | 160.62 |
| Ammonium Chloride | 13.52 | 13.50 | 13.50 | 13.52 |
| Makeup Water | 35.99 | 33.20 | 36.20 | 33.69 |
| Example 1 | 94.60 | — | — | — |
| Example 2 | — | 120.55 | — | 120.68 |
| Example 3 | — | — | 147.94 | — |
| Sodium Metabisulfite (SMB) | 0.17 | 0.18 | 0.17 | — |
| D.I. Water | 15.07 | 15.10 | 15.20 | — |
| 30% SMB Solution | 7.95 | 8.00 | 8.10 | 8.10 |
| Aerosol OT | 2.81 | 2.77 | 2.78 | 2.66 |
| Tergitol 15-S-9 | 9.41 | 9.29 | 9.31 | 8.90 |
| Emulsion Solids % | 35.0 | 34.4 | 33.5 | 35.8 |

TABLE II-continued

Graft Copolymerization (by inverse emulsion polymerization)

| Reagents Charged | Example 4 | Example 5 | Example 6 | Example 7 |
|---|---|---|---|---|
| Intrinsic Viscosity (dL/g) | 7.0 | 8.5 | 9.9 | 10.0 |

Aerosol OT = dioctyl ester of sodium sulfosuccinic acid, American Cyanamid
Tergitol 15-S-9 = CII-C15 secondary alcohol ethoxylate, Union Carbide
LOPS ® = low odor petroleum solvent, Exxon
Vazo 52 = 2,2,-azobis (2,4-dimethylyaleronitrile), DuPont

Example 7

Graft Copolymer Synthesis—Thermal Initiation

The apparatus, procedure and reagents similar to that described in Examples 4-6 was used except that this time, a thermal initiator, Vazo 52 was chosen. The polymerization was carried out at 40° C. for 3.5 hours and then at 45° C. for 2 more hours. After the polymerization was complete, high HLB surfactants were added to convert the emulsion into a self-inverting emulsion. The reagent charges and the intrinsic viscosity of Example 7 are shown in Table II.

PERFORMANCE TEST

In the following tests, the performance of the resulting water soluble graft copolymers described in this invention is demonstrated. A Capillary Suction Time (CST) device was used to measure the dewatering performance of the various polymers on several different substrates. The CST device consists of an electronic timer, a plexiglass cell holder containing two concentric electrodes, and a tall stainless steel cylindrical cell. The device operates by measuring the drainage of water from a sludge substrate out of the cell. This is accomplished by placing the cell holder containing the two electrodes on a piece u of Whatman #17 chromatography paper, 7.0×9.( cm in size. The tall cylinder is then placed in the hole in tte cell holder. The cell holder is connected to the electronic timer, which is turned on and reset. A 7 ml aliquot of the substrate is introduced into the cell. As the water migrates out of the cell, it is absorbed onto the chromatography paper. This results in a migration of a water front through the paper. As the water advances, it contacts the first electrode, activating the timer. Continued advancement of the water eventually reaches the second electrode, completing the circuit and shuttinl off the timer. The process is repeated for several polymer dosages. A dosage response curve plotting CST time (in seconds) versus polymer dosage gives an indication of a particular polymer's effectiveness in dewatering a substrate. The dosage curve minimum is an indication of the optimum polymer dosage, while the extent of the trough gives a measure of the polymer,s tendency to overdose. Overdosing is observed when the CST values increase with increasing polymer dosage. Generally, the trnatment which produces the lowest CST value at the lowest dosage is the most effective.

A sample of mixed primary and secondary sludge from a paper mill was used as the test substrate. The graft copolymer performance was compared to a commercial copolymer containing similar mole % of the cationic monomer used for this type of application. The copolymers were added to the water system to be treated in an amount sufficient to mainiain a concentration, based on active polymer, of from about 10 ppm to 1000 ppm.

Dewatering performance is presented in Table III.

TABLE III

Dewatering Performance

Sludge pH = 6.14  Total Solids = 2.04%

| Treatment | Polymer Dosage (ppm - Active) | CST (Seconds) |
| --- | --- | --- |
| Blank | — | 173.2 |
| Polymer A* | 37 | 113.4 |
|  | 74 | 48.2 |
|  | 111 | 24.6 |
|  | 129.5 | 37.1 |
|  | 148 | 25.6 |
|  | 185 | 15.2 |
|  | 222 | 15.3 |
|  | 259 | 15.5 |
|  | 296 | 13.1 |
|  | 370 | 38.9 |
| Example 4 | 17.5 | 73.5 |
|  | 35 | 37.6 |
|  | 70 | 14.4 |
|  | 105 | 17.9 |
|  | 113.8 | 19.4 |
|  | 122.5 | 12.4 |
|  | 131.3 | 18.8 |
|  | 140 | 21.5 |
|  | 175 | 19.0 |
|  | 245 | 24.4 |
|  | 315 | 33.1 |
| Example 5 | 34.4 | 62.3 |
|  | 68.8 | 30.3 |
|  | 103.2 | 15.2 |
|  | 120.4 | 16.0 |
|  | 137.6 | 15.9 |
|  | 172 | 14.9 |
|  | 206.4 | 18.3 |
|  | 240.8 | 14.1 |
|  | 275.2 | 18.9 |
|  | 344 | 34.1 |
| Example 6 | 33.5 | 59.9 |
|  | 67 | 37.7 |
|  | 100.5 | 34.4 |
|  | 117.3 | 16.7 |
|  | 134 | 9.6 |
|  | 150.8 | 13.7 |
|  | 167.5 | 10.0 |
|  | 201 | 13.3 |
|  | 234.5 | 15.6 |
|  | 268 | 22.3 |
| Example 7 | 35.8 | 86.2 |
|  | 71.6 | 30.1 |
|  | 107.4 | 19.0 |
|  | 143.2 | 15.8 |
|  | 161.1 | 14.7 |
|  | 179 | 14.4 |
|  | 214.8 | 11.5 |
|  | 250.6 | 14.6 |
|  | 286.4 | 17.7 |
|  | 358 | 25.7 |

*Polymer A = A commercial AMD/AETAC copolymer in emulsion form with an intrinsic viscosity of 14 dL/g and 37% solids.

The above data show that the graft copolymers in this invention are more effective in sludge dewatering than the commercially available material which is a random copolymer.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the

We claim:

1. A method of dewatering wastewater comprising adding to the wastewater from about 10 ppm to about 1000 ppm, based on active polymer, of a water soluble graft copolymer having the structure:

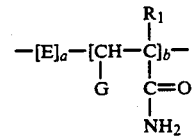

wherein E is the repeat unit obtained after polymerization of an $\alpha,\beta$ ethylenically unsaturated compound, the molar percentage of a:b is from about 95:5 to 5:95 with the proviso that the sum of a and b equals 100%, G comprises the structure:

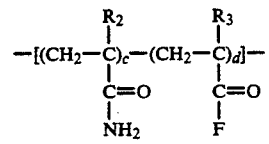

wherein $R_1$, $R_2$ and $R_3$ are the same or different and are hydrogen or a lower alkyl group having $C_1$ to $C_3$, F is the salt of an ammonium cation and the molar percentage of c:d is from 95:5 to 5:95 with the proviso that the sum of c and d euqals 100%.

2. The method of claim 1 wherein the ethylenically unsaturated compound is selected from the group consisting of (a) an ethylenically unsaturated carboxyilc acid, the amide form thereof, the alkyl ($C_1-C_8$) ester thereof, the hydroxylated alkyl ($C_1-C_8$) ester thereof and ethylenically unsaturated sulfonic acid.

3. The method of claim 2 wherein the ethylenically unsaturated carboxylic acid is selected from the group consisting of acrylamide, methacrylamide, acrylic acid, methacrylic acid, maleic acid, maleic anhydride, itaconic acid, 2-hydroxypropyl acrylate, methyl methacrlate and 2-ethylhexyl acrylate.

4. The method of claim 2 wherein the ethylenically unsaturated sulfonic acid is selected from the group consisting of styrene sulfonic acid and 2-acrylamido-2-methylpropyl sulfonic acid.

5. The method of claim 1 wherein F is selected from the group consisting of $NHR_3N^+R_{(4,5,6)}M^-$, wherein $R_3$ is a $C_1$ to $C_4$ linear or branched alkylene group, $R_4$, $R_5$ and $R_6$ are selected from the group consisting of hydrogen, $C_1$ to $C_4$ linear or branched alkyl, $C_5$ to $C_8$ cycloalkyl, aromatic or alkylaromatic grup, and $M^-$ is an anion selected from the group consisting of chloride, bromide, methyl sulfate and hydrogen sulfate.

6. The method of claim 5 wherein the cationic monomer is selected from the group consisting of 2-acryloyloxyethyltrimethyl ammonium chloride, 3-methacrylamidopropyltrimethyl ammonium chloride, 2-methacryloyloxyethyltrimethyl ammonium chloride and diallyl dimethyl ammonium chloride.

7. The method of claim 1 having the structure:

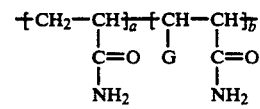

wherein the molar percentage a:b is from about 95:5 to 5:95, with the proviso that the sum of a and b equals 100%, and G has the structure:

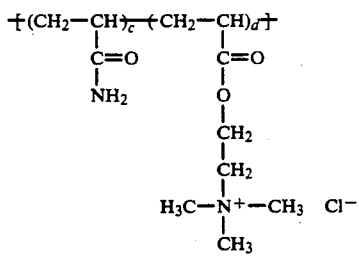

wherein the molar percentage of c:d is from 95:5 to 5:95 with the proviso that the sum of c and d equals 100%.

8. The method of claim 1 wherein the number average molecular weight of G is from about 1,000 to about 1,000,000.

9. The method of claim 8 wherein the number average molecular weight of G is from about 5,000 to about 500,000.

10. The method of claim 9 wherein the number average molecular weight of G is from about 10,000 to about 200,000.

11. The method of claim 1 wherein the copolymer has a number average molecular weight of from about 10,000 to 30,000,000.

12. The method of claim 22 wherein the copolymer has a number average molecular weight of from about 1,000,000 to 30,000,000.

* * * * *